United States Patent Office 3,591,388
Patented July 6, 1971

3,591,388
PURIFICATION OF MICROBIAL RENNETS
Huibert Cornelis Theüs Moelker and Rutger Matthijsen, Oss, Netherlands, assignors to Organon Inc., West Orange, N.J.
No Drawing. Filed Nov. 14, 1968, Ser. No. 775,941
Claims priority, application Netherlands, Nov. 25, 1967, 6716065
Int. Cl. A23c 19/02; C07g 7/02
U.S. Cl. 99—116                    7 Claims

ABSTRACT OF THE DISCLOSURE

The invention relates to a process for the purification of microbial rennets, contaminated by unspecific proteolytic enzymes, which are capable not only to coagulate or cloth milk, but also to digest the caseins of the obtained curdle, thus giving rise to a bitter flavour during the aging process of the cheese. The present process comprises contacting the impure rennet with an absorbing silicate at a pH between 3 and 9, by which the taste spoiling, unspecific enzymes are selectively absorbed. In this way the quality of microbial rennets can considerably be improved.

BACKGROUND OF THE INVENTION

The rennet of natural origin, rennin (IUB 3.4.4.3), also called milk-clotting enzyme, is obtained from the fourth stomach of suckling calves. Owing to the great scarcity of starting material for the production of rennin extensive researches have been made for a substitute. It has been known for a long time that proteolytic enzymes have milk-clotting activity. Well-known examples of such enzymes are: pepsin, chymotrypsin, papain, as well as proteolytic enzymes formed by bacteria such, for example, as *Pseudomonas fluorescens* and *Bacillus subtilis*.

In the practice of cheese-making, however, pepsin is used in some special cases only, because the said proteolytic enzymes have very strong proteolytic activity as well, which is, of course, undesirable.

The discovery of a number of microorganisms producing a milk-clotting enzyme—hereinafter called microbial rennet—with a very low proteolytic activity is therefore of very great importance. It is known that rennets have a specific proteolytic activity in respect to the protective colloid, kappa casein, and that by digestion thereof the casein of the milk is clotted. The production of microbial rennets is described in British patent specification No. 970,331 and U.S. patent specification No. 3,275,453. Such microorganisms are found among the genera Mucor, Rhizopus, Monascus, Colletrichum and Endothia. The practical application of these enzymes in cheese-making instead of animal rennet is of great importance. It has appeared that the use of a crystalline microbial rennet provides cheese of good quality.

Although the proteolytic activity of microbial rennet is almost negligible, it has appeared in practice that the rennet may yet be contaminated a little with undesired proteolytic enzymes, which enzymes also decompose the caseins of the curdled milk. There are various causes of these contaminations. Thus, for example, a rennet may be infected with another microorganism excreting undesired unspecific proteolytic enzymes on isolation from a culture of the relative microorganism. It is also possible that during prolonged fermentation of the organism, for example, to obtain a higher yield, an unspecific proteolytic enzyme is excreted together with microbial rennet. Furthermore it may happen that an interesting microorganism for the production of rennet cannot be used because the percentage of unspecific proteolytic enzymes is too high. Thus it is known that certain species of bacteria produce much rennet but also large quantities of unspecific enzyme (see e.g. Appl. Microbiol. 12,475 (1964)).

The occurrence of unspecific proteolytic activity in microbial rennet has various disadvantages in cheese-making. It has already been said that the proteins present in milk are digested further so that the consistency of the cheese is not satisfactory. But moreover there may occur undesired losses in weight due to the fact that the degradation products of the proteins are removed from the curds together with the whey.

Another disadvantage of the presence of unspecific proteolytic enzymes in microbial rennet is that during the aging process the cheese develops a bitter flavour caused by small quantities of very bitter peptides formed by decomposition of casein under the influence of very small quantities of unspecific enzyme present in the rennet as described in Proc. 16th Int. Dairy Congr. Copenhagen 1961, vol. B 353. The development of these bitter flavours is, of course, a great disadvantage on application of microbial rennet in cheese-making.

In view of the above it is desirable to use in the coagulation of milk a rennet with an almost negligible content of unspecific proteolytic enzymes for the production of cheese with a good flavour.

Therefore the present invention aims at providing a purified microbial rennet with which prime quality cheese can be obtained with a very nice taste. To achieve this it proved to be necessary to separate the clotting enzyme from the unspecific proteolytic enzymes selectively.

It is known that proteins can be attached to a great number of absorbents. Thus it is well-known that silicates show nonspecific protein absorption as described in, for example, Advances in Enzymology 14, 400 (1953). Examples of it are: the non-specific absorption of urinary proteins on Permutit described by Katzmann and Doisy, J. Biol. Chem. 148, 501 (1943), or on cabunite, mentioned by Johnson in Acta Endocrinologica 20, 101 (1955), and the purification of galactokinase by means of bentonite mentioned by Trucco, Arch. Bioch. 18, 137 (1948), in which about 50% of the proteins are nonspecifically absorbed.

SUMMARY OF THE INVENTION

A process has now been found for the removal of unspecific taste spoiling enzymes from microbial rennet, characterized in that an aqueous solution of the impure rennet is contacted with an absorbing silicate at a pH between 3 and 9, by which the unspecific enzymes are selectively absorbed, after which the absorbent is separated from the solution.

In this manner unspecific proteases and other undesired products are removed from the rennet preparation by absorption, a purified rennet remaining behind in solution.

It was quite unexpected that in a solution of microbial rennet a selective separation could be effected by silicates between two substances that are so related as microbial rennet and unspecific proteolytic enzymes. In this process the unspecific enzymes are for the greater part absorbed, the rennet remaining behind in the solution without having lost its activity. The absorption of the contaminating enzymes can be effected by adding an absorbent to the solution of the rennet and stirring the mixture for some time, followed by removal of the absorbent, for example, by filtration or centrifugation, or by passing the solution to be purified through a column of the absorbent.

Finally an enzyme concentrate or, if desired, a dry enzyme preparation, can be obtained by evaporation of the water or precipitation of the milk-clotting enzyme by any conventional technique such, for example, as salting out or precipitation with an organic solvent. It stands to reason that instead of one absorbent a mixture of two or more absorbents can be used, it also being possible to repeat the treatment with the same or another absorbent.

From rennet preparations, in which the ratio between clotting activity and proteolytic activity was about 6,000 to 11,000, purified rennets were thus obtained, in which this ratio had improved to about 14,000 to 20,000.

The choice of the pH during the absorption is determined by the stability of the microbial rennet at different pH's and by the absorption properties of the absorbent. The rennet is stable at a pH between about 3 and 9 dependent upon the temperature. On the other side the absorption of proteolytic enzymes occurs within this whole pH range. The absorption properties decrease according as the pH rises. Below pH 4 some microbial rennet, too, is absorbed as a rule, while outside the pH range 3–9 the rennet denaturates. The purification is preferably performed at a pH of about 5, that is to say between 4.5 and 6, at which pH the best results are obtained.

As starting material for the purification a powdery rennet can be used which is dissolved in water or a buffer solution at a pH between 3 and 9, preferably about 5, but it is also possible to use for this purpose a fermentation liquid containing the rennet. It is even possible to perform the purification during the last phase of the fermentation of a microorganism producing rennet. Preferably a submerged culture or an aqueous extract of a surface culture of a microorganism producing rennet is taken as starting material, because in this case the isolation and purification of the rennet can take place simultaneously, for example, by filtration over a silicate.

As examples of very suitable absorbents belonging to the groups of natural and synthetic silicates are mentioned: bentonite such as the types BIV 350 bianco, BIV 220 alvorio and Micro BIV, manufactured by Societa AZ. Mineraria Isole Pontine, Rome, Permutit such as Decalso F, supplied by Permutit Company, London, attapulgite and chemically pure colloidal silicon dioxide known by the trade name Aerosil. A good purification can also be obtained by means of cabunit and frankonit. Other silicates, too, can be used, such as asbestos, kaolin, silica gel, pumice-powder, tripoli, and Celite. The six former groups of silicates are far the best, however, because of their highly selective properties.

Further it has been found that rennet preparations prepared in this manner are eminently suitable for the production of cheese of good consistency and without bitter flavour. (In these rennet preparations the ratio between clotting activity and proteolytic activity, which are determined as described below, had become much higher.) It is obvious that the process can be applied for the production of rennets, the application of which is not limited to certain types of cheese. Now it is possible to produce different types of cheese on an industrial scale with a flavour that cannot be distinguished from cheese produced with animal rennet.

DETERMINATION OF CLOTTING ACTIVITY

This activity is determined by measuring the time which elapses between the addition of the rennet solution to milk (or vice versa) and the clotting of the milk, which is taken as a measure for the activity of the enzyme preparation. The clotting power is defined in accordance with Soxhlet.

By one clotting unit is meant the quantity of enzyme which causes 1 ml. of substrate to clot in 40 minutes at 35° C.

This determination is performed as follows: A 50-ml. graduated cylinder is filled with 25 ml. of new milk and heated for 15 minutes at 35° C. In a second graduated 50-ml. cylinder 1 ml. of a rennet solution is heated for some minutes at 35° C. If use is made of a powdery rennet this is dissolved in so-called Mulder buffer containing 100 gm. of sodium chloride and 10 gm. of sodium acetate per litre and of pH 5.65, adjusted with acetic acid. Then the previously heated milk is quickly added to the rennet solution. The time required for the flocculation of the milk is measured at 35° C. The activity of the preparation is calculated as follows: Let the clotting time be $t$ minutes; the quantity of rennet is $n$ milligram per ml.:

$$\text{Activity} = \frac{25 \times 40}{n \times t} \text{ u./milligram}$$

DETERMINATION OF THE PROTEOLYTIC ACTIVITY

The activity is determined by measuring at 280 m$\mu$ the absorbance of the fragments soluble in trichloro acetic acid, which fragments are obtained after partial degradation of casein at pH 6.0. The unit of proteolytic activity is defined as the quantity of enzyme which causes per minute at pH 6.0 and at 35° C. the formation of a quantity of soluble fragments equivalent to 1 $\mu$mol of tyrosine measured in the range within which there is a rectilinear relationship between dose and effect.

The determination is performed as follows:

To 5 ml. of a solution of 1% casein in 0.1 M phosphate buffer of pH 6.0, which has been previously heated for 5 minutes at 35° C., is added 1 ml. of the enzyme solution to be examined. The solution is mixed thoroughly and then incubated for 30 minutes at 35° C. Then 5 ml. of a 5% solution of trichloro acetic acid is added causing the non-degraded casein to precipitate. Ten minutes later the resulting suspension is filtered off, whereupon the absorbance is determined of the filtrate obtained at 280 m$\mu$.

The enzyme is determined with two concentrations of the enzyme which have been so chosen that the two points of measurement fall within the range within which there is a linear relationship between the dose of enzyme and effect. The blank determination is performed by adding first tricholoro acetic acid to the casein solution and then the enzyme solution. The value found is compared with that of a standard tyrosine solution which is determined in the same manner.

The enzyme activity can be calculated in the following manner:

$$\text{Activity} = \frac{\Delta E}{30 \times \Delta n \times E_s} \text{ U./mg.}$$

in which:

$\Delta E$ = the difference in absorbance measured for the two different enzyme concentrations and corrected for the blank values $\Delta n$ = the difference in enzyme concentration between the two solutions measured, expressed in mg./ml.

$E_s$ = the absorbance measured for the standard containing 1 $\mu$mol of tyrosine.

RATIO CLOTTING ACTIVITY/PROTEOLYTIC ACTIVITY

This ratio is calculated from the values found expressed in the formula:

$$R = \frac{30,000 \times \Delta n \times E_s}{n \times t \times \Delta E}$$

The taste of the cheese prepared with purified rennet preparations was judged by one of the organoleptic test-methods recommended by "The Committee on Sensory Evaluation of the Institute of Food Technologists" described in Food Technology 18, 1135 (1964). The taste of the cheese prepared with purified rennet preparations was judged by comparing it with cheese prepared with corresponding, but non-purified rennet preparations, by a group of experienced tasters in the laboratory.

For this purpose the so-called single sample test is adopted as described in, for example, Food Technology 11 (1957), insert 25. This test consists in that a group of experienced tasters are asked to indicate the absence or presence, and, if possible, the intensity of a certain characteristic property of a product. The results of a complete comparative examination are evaluated in an analysis of variance.

DESCRIPTION OF THE PREFERRED EMBODIMENTS

Below some examples are given of the production of purified rennet preparations and their application, to which the methods according to the invention are not limited however.

EXAMPLE I

Ten grams of a solid microbial rennet originating from *Mucor pusillus* was dissolved in 250 ml. of distilled water. To the resulting solution was added 10 gm. of bentonite BIV 350 bianco, after which the pH was adjusted to 5.0 by means of 1 N acetic acid. The resulting suspension was stirred for 15 minutes and then filtered over a fluted filter. The clotting and proteolytic activities were determined before and after the absorption step by the methods mentioned above, and included in the following table together with the ratio R:

| Activities in u./ml. | Before absorption | After absorption |
|---|---|---|
| Clotting activity, u | 13,600 | 13,450 |
| Proteolytic activity, u | 2.40 | 0.96 |
| R | $5.67 \times 10^3$ | $14.01 \times 10^3$ |

EXAMPLE II

To 50 ml. of a crude aqueous extract of a surface culture of *Mucor pusillus* containing 600 Soxhlet u./ml. was added 500 mg. of bentonite BIV 220 alvorio. The resulting suspension was adjusted to pH 5.0 with 1 N acetic acid and stirred for 1 hour at room temperature. Then the suspension was centrifuged and the resulting supernatant liquid cooled down to $-5°$ C. to obtain 42 ml. of a clear extract. To this extract was added, while stirring, 96 ml. of ethanol of $-15°$ C. The resulting residue was filtered and dried in a vacuum desiccator. Yield about 23,900 Soxhlet u. In the same manner a preparation was prepared without bentonite. In this case the yield amounted to 24,100 Soxhlet u. The coagulative and proteolytic activities were included in the table below together with the ratios.

| Activities | Crude extract | Unpurified final prod. | Purified final prod. |
|---|---|---|---|
| Clotting act., u | 30,000 | 24,100 | 23,900 |
| Proteolytic act., u | 5.50 | 4.61 | 1.65 |
| R | $5.45 \times 10^3$ | $5.22 \times 10^3$ | $14.48 \times 10^3$ |

EXAMPLE III

The purified rennet obtained in accordance with Example I was used in the production of cheese in a comparative experiment with unpurified rennet.

To 20 ml. of uncooked new milk was added 3 ml. of the purified rennet solution obtained in accordance with Example 1, 4 gm. of saltpetre and 1% starter culture. The temperature at which coagulation occurs is 30° C. Coagulation time 31 minutes.

In the same manner 20 l. of milk was coagulated with 3 ml. of the unpurified rennet preparation mentioned in Example I, clotting time 30½ minutes.

The curdled milk was cut into slices, during which operations excretion of whey occurred. To further this excretion process the mass was regularly kept in motion for 20 minutes with a cheese-harp. Then, after removal of 10 l. of whey, 6 l. of water of 45° C. was added to the curdled milk, after which the temperature was 37° C. The mass was kept in motion for about 50 minutes with a cheese-harp. Then the curdled milk was separated from the whey by means of a pressing plate fitted with perforations. Finally the curdled milk was divided into two portions. These portions were put into warm cheese-moulds, which were placed under a press. After 6 weeks and 6 months respectively a group of 8 experienced tasters submitted the cheeses to an organoleptic examination by a comparative taste test in accordance with Simone et al.

The following result was obtained by the group of 8 tasters:

The cheese prepared with the purified rennet is stated under A and the cheese prepared with the unpurified starting material under B.

| | Cheese A | | Cheese B | |
|---|---|---|---|---|
| | After 6 weeks | After 6 months | After 6 weeks | After 6 months |
| Bitter | 0 | 0 | 1 | 2 |
| Somewhat bitter | 1 | 0 | 7 | 6 |
| Not bitter | 7 | 8 | 0 | 0 |

EXAMPLE IV

After fermentation in the presence of the mycelium 10 gm. of bentonite Micro BIV was added to 4.1 of a submerse culture of *Rhizopus peka*. The activity of the solution was 120,000 Soxhlet u. per litre, and the proteolytic activity 60 u. per litre. The pH of the fermentation liquid was adjusted to 5.0 with 1 N hydrochloric acid and the suspension was stirred for another 15 minutes. Then the fermentation was stopped and the solid substances were removed from the culture by filtration. Then the clotting and proteolytic activities were determined in the clear filtrate. A clotting activity was found of 114,000 Soxhlet u. per litre and a proteolytic activity of 8 u. per litre so that the ratio R between clotting and proteolytic activities had improved from 2,000 to 14,250.

In the same manner as described in Example III cheese was prepared with a rennet preparation treated with 0.35 l. of bentonite and with a non-treated rennet preparation. An organoleptic examination held in the same manner as in Example III by a group of experienced tasters showed that the taste of the cheese prepared with purified rennet had considerably improved (see the following table).

| | Cheese prep. with purified rennet | | Cheese prepared with crude rennet | |
|---|---|---|---|---|
| | After 6 weeks | After 6 months | After 6 weeks | After 6 months |
| Bitter | 0 | 0 | 6 | 2 |
| Somewhat bitter | 1 | 1 | 2 | 6 |
| Not bitter | 7 | 7 | 0 | 0 |

EXAMPLE IV

To 10 gm. of a microbial rennet originating from a surface culture of *Mucor pusillus* dissolved in 250 ml. of water, was added 10 gm. of a synthetic sodium aluminium silicate, Decalso F. The pH of the rennet solution was adjusted to 5.0 with 1 N acetic acid. The solution was stirred for 20 minutes, after which the absorbent was filtered off. Then the rennet was isolated by adding 115 gm. of ammonium sulphate (i.e. till saturation 0.76). The precipitate was filtered off, dialysed and evaporated to dryness to obtain 4.68 gm. of purified rennet A with an activity of 790,000 Soxhlet u. per gram. Ten grams of the same starting material were treated in the same manner, but no absorbent was added to the solution of the crude rennet. Yield 4.92 gm. of rennet B; activity 765,000 Soxhlet u. per gram.

After determination of the proteolytic activity of the samples A and B a calculation showed that the ratio R for rennet A is 23,500 and for sample B 6,475.

In this case, too, experienced tasters ascertained an important improvement in taste in a same organoleptical test as described in Example III.

EXAMPLE VI

One hundred millilitres of a microbial rennet originating from *Endothia parasitica* of pH 5.0, containing 100 Soxhlet u. of clotting activity per ml. was passed over a column filled with 3 gm. of a synthetic sodium aluminium silicate Decalso F. The column was washed with 15 ml.

of a solution containing 0.01 M of sodium acetate at pH 5.0.

The total column eluate obtained contained 9,800 Soxhlet u., the total proteolytic activity having decreased to 0.47 u. as compared with 1.43 u. in the starting material.

In this case, too, it was established in an organoleptic test as described before that the bitter taste which develops on application of unpurified rennet has entirely disappeared in cheese prepared with rennet purified in the above manner.

EXAMPLE VII

Ten grams of microbial rennet from *Mucor pusillus* Lindt was dissolved in 125 ml. of 0.05 M phosphate buffer of pH 8.0. To this solution was added a suspension of 10 gm. of asbestos fibre in 125 ml. of water. The resulting suspension was stirred for 15 minutes at room temperature and then filtered off. The clotting activity and proteolytic activity of the filtrate were measured and compared with those of the starting solution (see table below).

| Activities in u./ml. | Before absorption | After absorption |
|---|---|---|
| Clotting activity, u | 13,400 | 11,000 |
| Proteolytic activity, u | 2.38 | 0.96 |
| R | 5,630 | 11,460 |

EXAMPLE VIII

Ten grams of microbial rennet originating from *Mucor pusillus* Lindt was dissolved in 125 ml. of 0.05 M phosphate buffer of pH 3.5. To the solution was added a suspension of 10 gm. of bentonite in 125 ml. of water and the resulting suspension was stirred for 15 minutes at room temperature. After removal of the bentonite by filtration the clotting and proteolytic activities of the solution were measured and compared with those of the starting solution (see table below).

| Activities in u./ml. | Before absorption | After absorption |
|---|---|---|
| Clotting activity, u | 13,400 | 3,500 |
| Proteolytic activity, u | 2.44 | 0.15 |
| R | 5,490 | 23,400 |

EXAMPLE IX

Ten grams of microbial rennet originating from *Mucor pusillus* Lindt was dissolved in 125 ml. of 0.05 M phosphate buffer of pH 5.0. To this solution was added a suspension of 10 gm. of Aerosil in 125 ml. of water and the mixture was stirred for 15 minutes at room temperature. After filtration the clotting and proteolytic activities of the solution were measured and compared with those of the original rennet solution.

| Activities in u./ml. | Before absorption | After absorption |
|---|---|---|
| Clotting activity, u | 13,400 | 11,030 |
| Proteolytic activity, u | 2.44 | 0.96 |
| R | 5,490 | 11,500 |

What is claimed is:

1. Process for the purification of a microbial rennet which contains as an impurity a proteolytic enzyme capable of hydrolyzing casein to form hydrolysates having an undesirable taste or flavor, which comprises removing said proteolytic enzyme impurity from said rennet by contacting an aqueous solution of the impure rennet with a solid silicate absorbent capable of selectively absorbing said impurity, at a pH between about 3 and about 9, and separating the absorbent and absorbed impurity from the purified rennet solution.

2. The process of claim 1 in which the pH is about 5.

3. The process of claim 1 in which the rennet to be purified is a submerged culture of a rennet-producing microorganism.

4. The process of claim 1 in which the rennet to be purified is an aqueous extract of a surface culture of a rennet-producing microorganism.

5. The process of claim 1 in which the rennet to be purified is contacted with the silicate absorbent in the form of a column.

6. The process of claim 1 in which the silicate absorbent is at least one member selected from the group consisting of silica gel, bentonite, Permutit, attapulgite, cabunit, frankonit, and colloidal silicon dioxide.

7. Process for the production of cheese, which comprises clotting milk with a purified microbial rennet prepared in accordance with the process of claim 1.

References Cited

UNITED STATES PATENTS

| 3,042,584 | 7/1962 | Kooi et al. | 195—66X |
| 3,254,003 | 5/1966 | Croxall | 195—66 |
| 3,482,997 | 12/1969 | Murray et al. | 99—116 |

OTHER REFERENCES

Dixon et al., Enzymes. Academic Press Inc., Pub., New York, 1964, pp. 41–44.

LIONEL M. SHAPIRO, Primary Examiner

D. M. NAFF, Assistant Examiner

U.S. Cl. X.R.

195—66